United States Patent Office 3,162,112
Patented Dec. 22, 1964

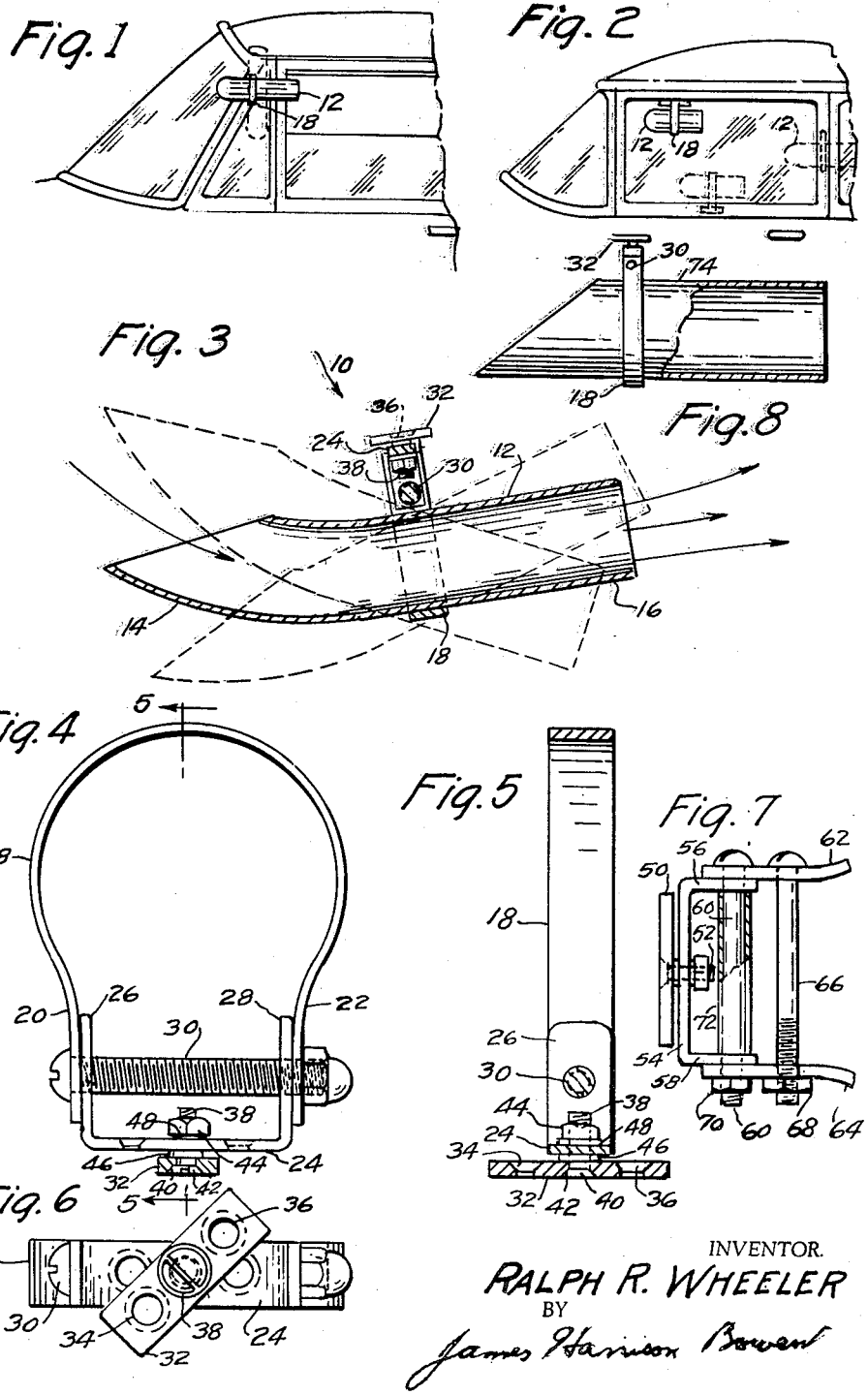

3,162,112
AUTO PRESSURE COOLER AND VENTILATOR
Ralph R. Wheeler, St. Petersburg, Fla.
(4919 Gulfport Blvd., Gulfport 7, Fla.)
Filed Sept. 4, 1963, Ser. No. 306,509
2 Claims. (Cl. 98—2)

The present invention relates to ventilation, and particularly cooling of motor vehicles of the pleasure type, and in particular includes a controlled stream of fresh air adjustably mounted to provide a pressure cooler and ventilator with a blast of cool air discharged to blow air toward any desired point in a vehicle.

The purpose of this invention is to provide a pressure cooler and ventilator whereby a controlled stream of fresh air is directed to the operator, or to another person or persons in a motor vehicle without power or other mechanically operated means.

Deflectors, fans, and other devices have been provided for circulating air in automobiles. However, such devices provide a drain on the battery of the vehicle, and, at best, produce only a weak stream of air which is relatively ineffective.

The object of this invention is, therefore, to provide a pressure cooler for a motor vehicle, in which the cooler has no moving or operating parts, and means for adjustably mounting the cooler on a vehicle.

Another object of the invention is to provide a pressure cooler for motor vehicles which consists, only, of a tube, and an adjustable mounting bracket.

Another important object of the invention is to provide a pressure cooler for motor vehicles which may be adjusted by one hand of an operator of the vehicle while the vehicle is in operation.

A further object of the invention is to provide a pressure cooler for motor vehicles which includes a longitudinally disposed horizontally positioned tube, the leading or forward end of which is of greater area than the opposite or trailing end whereby the velocity of air being discharged from the tube is greater than that of air passing into the tube.

A still further object of the present invention is to provide a pressure cooler and ventilator for supplying a controlled stream of fresh air to the interior of a motor vehicle body in which the cooler and ventilator is of simple and economical construction.

With these and other objects and advantages in view the invention embodies a tube having an arcuate leading end and an adjustable bracket for mounting the tube on a vehicle.

Other features and advantages of the present invention will appear from the following description taken in connection with the drawings, wherein:

FIGURE 1 is a side elevational view of a forward corner of a motor vehicle showing the improved pressure cooler and ventilator mounted on the body of the vehicle, and showing the cooler in an operative position in full lines and in an inoperative position in dotted lines.

FIGURE 2 is an elevational view similar to that shown in FIGURE 1 illustrating use of the pressure cooler and ventilator on the upper rail of a front door, on the lower part of the door, and on a vertical member at the rear of the door.

FIGURE 3 is a longitudinal section through the pressure cooler and ventilator, with the tube of the cooler shown in adjusted positions in broken lines.

FIGURE 4 is a front elevational view of an adjustable bracket for attaching the pressure cooler and ventilator to a vehicle.

FIGURE 5 is a cross section through the adjustable or mounting bracket, taken on line 5—5 of FIGURE 4.

FIGURE 6 is a view looking upwardly toward the under surface of the bracket showing a swivel mounting bar turned through an angle of 45°.

FIGURE 7 is a view similar to that shown in FIGURE 4, illustrating a modification wherein an adjusting screw is provided between the base of the bracket and tube holding loop thereof.

FIGURE 8 is a view illustrating a further modification in which the tube is provided with a straight, instead of an arcuate end.

While one embodiment of the invention is illustrated in the above-referred-to drawings, it is to be understood that it is merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated to the primary field of utility of the invention it remains obvious that it may be employed in any other capacity wherein it may be found applicable.

In the accompanying drawings, and in the following specification, the same reference characters are used to designate the same parts and elements throughout and in which the numeral 10 refers to the invention in its entirety, numeral 12 indicating a tube having a leading or entrance end 14 and a straight or discharge end 16, numeral 18 indicating a strap having parallel ends 20 and 22, numeral 24 referring to a base of a U-shaped clamp having extended arms 26 and 28, numeral 30 indicating a screw for clamping the tube 12 in the strap 18, and positioned with one end extended through the end 20 of the strap and arm 26 of the clamp, and the opposite end extended through the end 22 of the strap and arm 28 of the clamp, and numeral 32 indicating a mounting or swivel bar having countersunk openings 34 and 36 in the ends, and secured by a bolt 38 in the base 24 of the U-shaped clamp.

The bolt 38 is provided with a frustro-conical shaped head 40 that is positioned in a countersunk opening 42 in the bar 32, as shown in FIGURES 4 and 5, and the opposite end is provided with a nut 44. Spring lock washers 46 and 48 are provided between the bar 32 and nut 44 and the base 24, respectively, and by this means the tube 12 may be secured in any desired position, as indicated by the dotted lines, in FIGURE 3.

In the mounting bracket illustrated in FIGURE 7 a bar 50 similar to the bar 32 is adjustably secured by a volt 52 in a base 54 of a U-shaped clamp, having arms 56 and 58, and the arms are pivotally mounted on a swivel bolt 60 in the arcuate ends 62 and 64 of a tube holding strap, similar to the strap 18. The strap is drawn around a tube, such as the tube 12 by an adjusting screw 66 having a nut 68 on the threaded end thereof, and the swivel bolt 60, which is also provided with a nut 70, is provided with a sleeve 72, which provides a freely turning swivel joint with the nut 70 loosened. It will be understood that the tube 12 may be provided with an arcuate end, as shown in FIGURE 3, or with a straight end, as shown in FIGURE 8, in which the tube is indicated by the numeral 74, and the tube may be mounted on the vehicle by other suitable means.

With the parts assembled as illustrated and described the tube and bracket may be mounted on a motor vehicle, as shown in FIGURES 1 and 2, and the bar 32, or the base 24 of the clamp, may be secured by screws, bolts, or other fastening elements in the countersunk openings 34 and 36 of the bar or clamp; and the position of the tube is adjusted by loosening the nuts as described.

The tubes 12 and 74, and mounting elements thereof, may be of plastic, aluminum, or other suitable material, and the tube may be located in any desired position on the vehicle.

With one of the tubes positioned, as shown in FIGURE 1, air is scooped up by the forward or leading end, and a blast of air, at relatively high velocity, is discharged into the vehicle from the trailing end.

The pressure cooler and ventilator of this application is an improvement over the motor vehicle pressure cooler of my copending application with the Serial No. 296,725, in that the swivel bar 32 is added below the base of the U-shaped clamp of the former application.

What is claimed is:
1. In a pressure auto cooler, the combination of
   (a) an enlongated tube with means forming a window opening of a motor vehicle,
   (b) a strap having spaced parallel perforated ends extended around said tube, and positioned with said ends extended from the tube and with the tube discharging through the window opening into the vehicle,
   (c) a swivel bolt having a sleeve thereon extended through the perforated ends of said strap, and projected from side surfaces thereof,
   (d) an adjusting screw also extended through said perforated ends of the strap and positioned parallel to said swivel bolt,
   (e) an a U-shaped support having right angularly disposed ends positioned with the ends between said parallel perforated ends of the strap and with the ends of the swivel bolt also extended through said right angularly disposed ends of the support.
2. A pressure auto cooler as described in claim 1 having a mounting bar pivotaly attached to said U-shaped support.

References Cited by the Examiner
UNITED STATES PATENTS

| | | | |
|---|---|---|---|
| 1,373,087 | 3/21 | Leyerer | 248—88 |
| 1,847,861 | 3/32 | Bradbury | 98—2.2 |
| 2,744,706 | 5/56 | Gerdy | 248—62 |
| 3,012,812 | 12/61 | Miller | 98—2.2 |
| 3,122,346 | 2/64 | Seiler | 248—62 |

ROBERT A. O'LEARY, *Primary Examiner.*

MEYER PERLIN, *Examiner.*